May 14, 1968 J. K. LAUCHNER ET AL 3,383,659
AUTOMATICALLY RESPONDING CIRCUIT FOR PROVIDING
DIFFERENT OUTPUT SIGNALS AS THE INPUT
SIGNAL CHANGES
Filed April 10, 1964
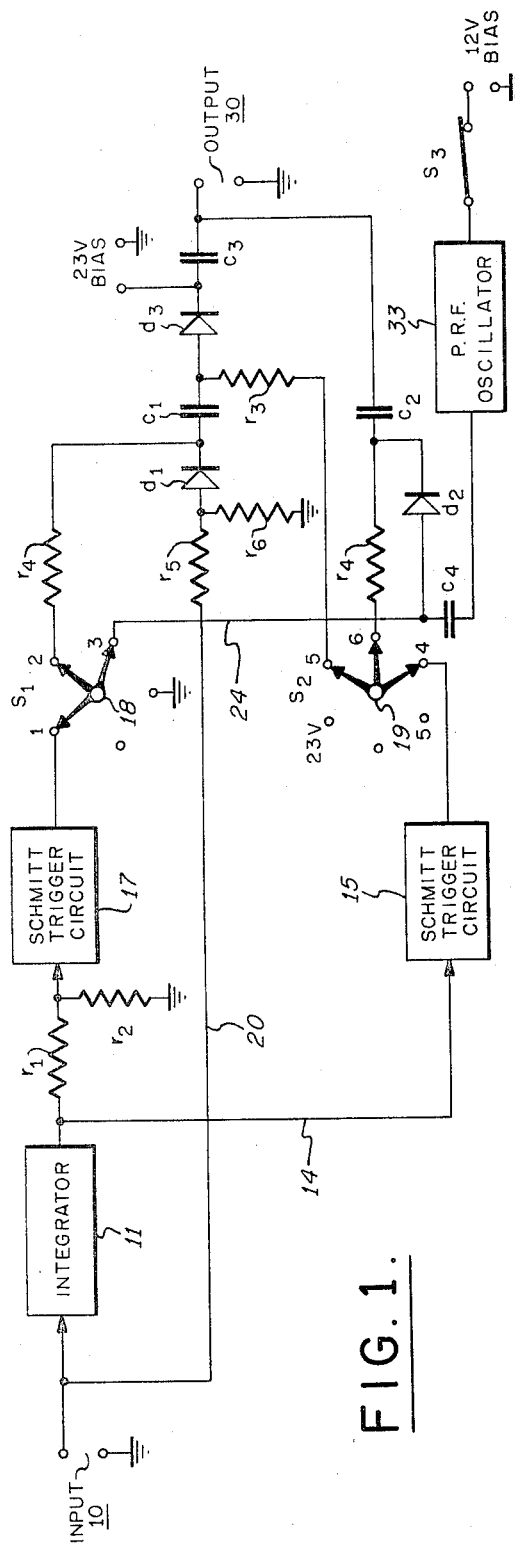
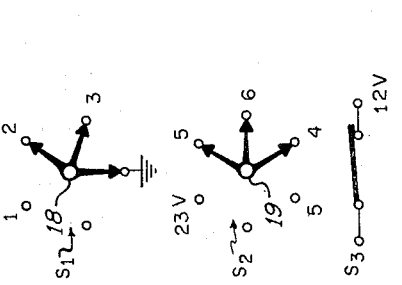
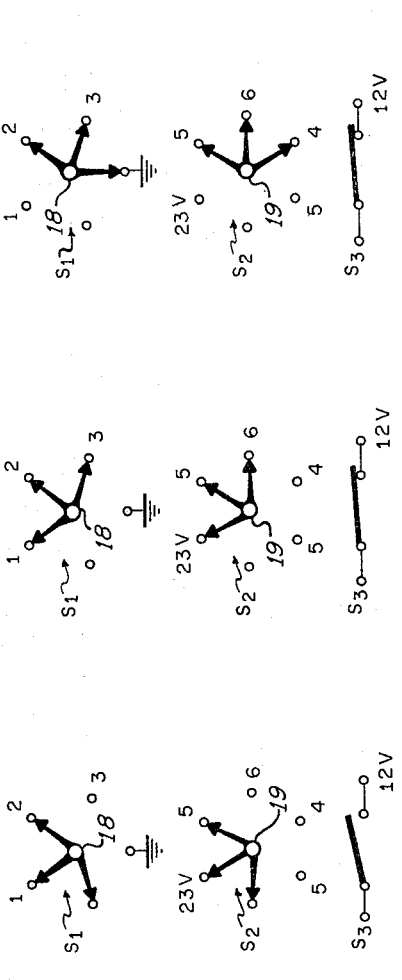
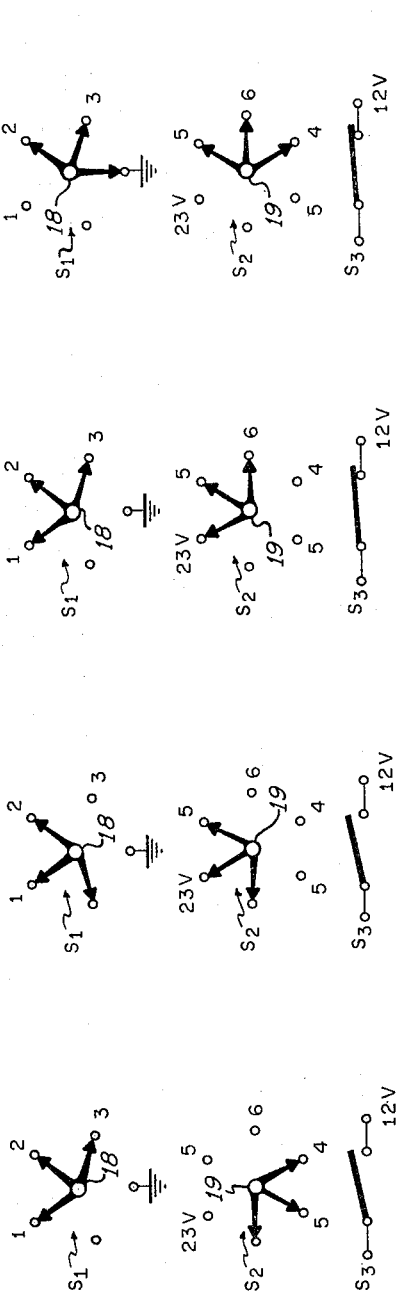
INVENTORS
JOHN K. LAUCHNER
WILLIAM F. TREPAS
BY
John H. Gallagher
ATTORNEY United States Patent Office 3,383,659
Patented May 14, 1968

3,383,659
AUTOMATICALLY RESPONDING CIRCUIT FOR PROVIDING DIFFERENT OUTPUT SIGNALS AS THE INPUT SIGNAL CHANGES
John K. Lauchner and William F. Trepas, Phoenix, Ariz., assignors to Sperry Rand Corporation, Great Neck, N.Y., a corporation of Delaware
Filed Apr. 10, 1964, Ser. No. 358,810
10 Claims. (Cl. 340—172)

ABSTRACT OF THE DISCLOSURE

An automatic mode selecting circuit for converting a pulse transponder to a free running (self-sustaining oscillation) beacon in the event that the amount of transponder interrogation is below or above pre-established values. The interrogation amount is detected to provide respective controlling signals which actuate diode gating circuits to selectively connect either the received interrogation pulses or internally generated oscillations to the transponder output in accordance with the detected amount of transponder interrogation.

This invention relates to electronic apparatus for automatically responding to some characteristics or parameter of received signals by providing one of a combination of possible output responses, the particular output response that is provided being dependent on the nature of the received input signal.

This invention is useful, as one example, in a transponder that is carried by a drone, or remotely controlled aircraft. In the communicating link that is established between the controlling, or interrogating, station and the controlled drone aircraft, the pulsed signals transmitted by the controlling station may include identification signals, aircraft control (command) signals, and ranging signals. Further positional information on the drone aircraft may be obtained by angle tracking at the controlling station. The normal responding signal from the transponder may include an identification signal, a ranging signal, and pulse coded information signals relating to aircraft performance and/or misson assignment. When used in a military environment the tactical situation may require that the transponder automatically function by sending out different types of responses as different environment conditions are encountered. These environmental conditions may include such things as the receipt of intentional or unintentional jamming signals, or possibly the temporary or permanent loss of controlling signals. It further may be desired that it be possible to select any one of several different combinations of transponder responses for responding to the various possible environmental conditions that may be encountered.

If jamming signals are encountered by the drone aircraft while at a remote location from the controlling station, and these jamming signals prevent the transponder from functioning in its normal manner because the pulse repetition frequency of the received pulses may be too high, or because the pulses may not be correctly positioned, i.e., improperly coded, it may be desired that the drone transponder automatically assume a different mode of operation that provides a responding signal that enables the controlling station to continue monitoring the performance and/or location of the drone, despite the fact that the controlling station signals no longer are effective to initiate the response in the normal manner. Alternatively, it may be desirable that the transponder operation be programmed so that the drone aircraft automatically will function to cease sending out responding signals when jamming signals are encountered, that is, the drone will remain silent. These alternative modes of operation of the transponder also may be desirable in the event that the interrogating and command signals from the controlling station are interrupted, as by obstructions, and cannot be received by the transponder. Therefore, by providing means for permitting a transponder to automatically change its mode of operation as various environmental conditions are encountered, and by providing means for selection of the particular responses, the capabilities and utility of the transponder are greatly enhanced.

Accordingly, it is an object of this invention to provide apparatus for automatically responding to some parameter or characteristic of an input signal and for producing any one of a number of different output signals dependent upon the nature of said input signal.

Another object of this invention is to provide apparatus that will pass a repetitive input signal if the repetition frequency is within certain limits or, alternatively, to provide a self-generated output signal if the repetition frequency of the input signal is without the limits.

A further object of this invention is to provide electrical circuitry for responding to a desired series of input pulses and producing any one of a number of different types of output signals, depending upon the repetition frequency of the input pulses.

Another object of this invention is to provide apparatus for responding to some characteristic of an input signal and for providing any one of a plurality of combinations of possible output signals, wherein respective ones of the output signals of the combination are produced as the characteristics of the input signal varies.

These and other objects and advantages of the present invention will become more apparent after reading the specification and claims below, which in turn refer to the accompanying drawings wherein:

FIG. 1 is an illustration partially in block form and partially in schematic form of a circuit for accomplishing the above-stated objects; and FIGS. 2–5 are illustrations of alternative switching arrangements for the switches in the circuit of FIG. 1 that provide different modes of operation for the circuit.

In accordance with the present invention, means responsive to received pulsed signals produces corresponding pulses of constant amplitude and width, irrespective of the rate of occurrence of the received pulses. The pulses of constant amplitude and width then are integrated to provide a direct current (D.C.) signal whose amplitude is a function only of the rate of occurrence of the received pulses. The amplitude of this D.C. signal controls first and second bistable D.C. biasing sources, each of which provides output biasing voltages at one of two possible amplitudes that correspond to the two stable states. The two biasing sources transfer from their respective first to their second stable states at different magnitudes of the integrated D.C. signal, i.e., at lower and higher repetition rates of the received pulses. The D.C. biasing voltages control a diode gating, or routing, circuit through which both the input terminal and a free running pulse source are connected to the output terminal. The biasing voltages, operating in response to the integrated D.C. voltage, control the diode gating circuit in such a manner that the input terminal is connected through to the output terminal when the repetition rate of input pulses is between the lower and higher repetition rates at which the two bistable biasing sources transfer to their second stable states, and the free running pulse source is connected through to the output terminal when the repetition rate of the input pulses is below or above these lower and higher repetition rates. Switching means and further biasing voltage sources of fixed magnitudes are provided for cooperating with the diode switching means to provide different possible combinations of responses at the output terminal as the repetition frequency of the input pulses vary. One of the various possible responses at the output terminal may include no signal at all, that is, under certain conditions the transponder would remain silent.

Referring now in detail to the circuit of FIG. 1, input terminal 10 is adapted to receive a succession of constant amplitude and constant width input pulses whose repetition rate may vary, or possibly, receipt of the pulses may be interrupted completely. The input pulses may be the output pulses from some pulse generator (not illustrated) that is triggered by interrogator pulses from some source such as a controlling station, a monitoring station, or interrogating aircraft, for example. The received input pulses are coupled to an integrator 11 which responds thereto to produce an output D.C. voltage whose amplitude is a function only of the rate of occurrence of the input pulses since both the height and duration of the input pulses thereto are constant. The output of integrator 11 is coupled over lead 14 to a first Schmitt trigger circuit 15, and also is coupled, after being divided down by a voltage divider comprised of resistors $r_1$ and $r_2$, to a second Schmitt trigger circuit 17. A Schmitt trigger circuit is a well known circuit and is described, for example, on page 164 of a text entitled, "Pulse and Digital Circuits," by Millman and Taub, published in 1956 by McGraw-Hill Book Company, New York, N.Y. A Schmitt trigger circuit is a bistable switching circuit that initially is in a first stable state and remains in this state so long as the applied input signal is less in amplitude than a predetermined threshold value. When the input signal exceeds the threshold value, or limit, the trigger circuit assumes the second one of its stable states and will remain in this state until the input signal amplitude again falls to a lower level. The output signal of a Schmitt trigger circuit is characterized by first and second voltage levels that correspond respectively to its two stable states. The first voltage level of each trigger circuit is a low voltage and the second voltage level is a high voltage.

The outputs of trigger circuits 17 and 15 are coupled respectively to the multiple-position switches $s_1$ and $s_2$ which have the multiple-contact rotor members 18 and 19, each of which provides a common connection between three respective contact points on the stator portion of its respective switch. For example, in switch $s_1$ the multiple-contact rotor member 18 provides a common connection, or common junction point, between the stator contacts 1, 2, and 3. As may be seen in the illustration, another one of the stator contacts of switch $s_1$ is grounded and a further one is open circuited. In switch $s_2$, rotor member 19 provides a common connection between stator contacts 4, 5, and 6 which are connected to operating portions of the circuit, and two other of the stator contacts respectively are open circuited and connected to a 23 volt source of biasing voltage. It will be noted in switch $s_2$ that two of the stator contacts are designated by the numeral 5 to indicate that both of these contacts provide the same electrical connection to the circuit. It should be understood that the illustrated switching arrangement is used only as an example and that other arrangements may be utilized to accomplish the desired circuit connections.

The output signals of the trigger circuits 15 and 17 provide D.C. biasing voltages for the diodes $d_1$, $d_2$, and $d_3$, which constitute a signal routing or switching circuit. With the switching arrangement illustrated in the drawing, the D.C. biasing voltage of trigger circuit 15 is coupled from contact 4 of switch $s_2$ through rotor 19, contact 5, and resistor $r_3$ to the anode of diode $d_3$, and also is coupled through rotor 19, contact 6, and resistor $r_4$ to the cathode of diode $d_2$. The D.C. biasing voltage of trigger circuit 17 is coupled from contact 1 of switch $s_1$, through rotor 18, contact 2, resistor $r_4$ to the cathode of diode $d_1$, and through rotor 18, contact 3 of switch $s_1$, over lead 24 to the anode of diode $d_2$. The anode of diode $d_1$ is coupled to receive input pulses from input terminal 10 via lead 20 and a voltage divider comprised of resistors $r_5$ and $r_6$. The values of resistors $r_5$ and $r_6$ are chosen so that the amplitude of the divided down pulses from input terminal 10 are of sufficient magnitude to pass through diode $d_1$ when trigger circuit 17 is in its first stable state, but will not pass through diode $d_1$ when trigger circuit 17 is in its second stable state. The cathode of diode $d_1$ is coupled through A.C. coupling condenser $c_1$ to the anode of diode $d_3$ whose cathode is permanently biased by a 23 volt biasing source. Diode $d_3$ is coupled through A.C. coupling capacitor $c_3$ to output terminal 30. The cathode of diode $d_2$ also is coupled to output terminal 30 through the A.C. coupling capacitor $c_2$. Capacitors $c_1$, $c_2$, $c_3$ isolate the output terminal 30 from the D.C. biasing voltages of the circuit.

A source of constant-amplitude, constant-width pulses is provided by P.R.F. oscillator 33 which operates as a free running pulse source when connected by switch $s_3$ to the 12 volt biasing source. Oscillator 33 is coupled through A.C. coupling capacitor $c_4$ to the anode of diode $d_2$. The particular values of biasing voltages given are examples only that were found suitable with an embodiment of the invention employing transistors and semiconductor diodes.

As connected in the manner just described, the circuit of the present invention is capable of operating in the first one of several different modes of operation. As will be explained hereinbelow, switches $s_1$, $s_2$, and $s_3$ may provide different interconnections of the circuit so as to provide different operating modes of the circuit.

The circuit illustrated in FIG. 1 functions in the following manner. The input pulses are received at input terminal 10 and in response thereto integrator 11 produces a D.C. voltage whose amplitude is a function of the rate of occurrence of said pulses. The parameters of Schmitt trigger circuit 15 are proportioned so that it will transfer from its first to its second stable state at some predetermined voltage level of the input signal applied thereto, this voltage level being chosen to correspond to some fixed rate of occurrence of the input pulses. Trigger circuit 17 may be substantially identical to trigger circuit 15 but because of voltage divider $r_1$ and $r_2$, trigger circuit 17 will not transfer to its second stable state until the D.C. voltage from integrator 11 has attained some amplitude higher than that at which trigger circuit 15 transfers.

The circuit illustrated in FIG. 1 is capable of three separate responses depending upon whether the amplitude of the D.C. voltage from integrator 11 is below the threshold level of trigger circuit 15, is above the threshold level of trigger circuit 15 but below that of trigger circuit 17, and finally, above the threshold level of both trigger circuits 15 and 17. In determining the threshold levels of trigger circuits 15 and 17 it will be assumed that when the D.C. voltage level from integrator 11 exceeds the threshold level of trigger circuit 15 but not trigger circuit 17, the rate of occurrence of the input pulses is within acceptable limits, but is without the acceptable limits when neither or both threshold levels of the trigger circuit have been exceeded.

In the first possible response of the circuit of FIG. 1 wherein input pulses are either completely absent or are below the acceptable level, the D.C. voltage from integrator 11 will be insufficient to transfer either of the trigger circuits 15 or 17 to its second stable state. Therefore, input pulses coupled over lead 20 and divided down by voltage divider $r_5$–$r_6$ will be of sufficient magnitude to couple through diode $d_1$ and will couple through capacitor $c_1$ to the anode of diode $d_3$. The low biasing voltage from trigger circuit 15 on the anode of diode $d_3$, when combined with the divided down input pulses coupled thereto, are insufficient in magnitude to overcome the 23 volt biasing voltage applied to the cathode thereof. Consequently, input pulses will be blocked by diode $d_3$ and will not appear at output terminal 30.

On the other hand, regularly occurring pulses from P.R.F. oscillator 33 are coupled through capacitor $c_4$ to the anode of diode $d_2$. Both the anode and the cathode of diode $d_2$ are biased by voltages of substantially the same magnitude, since both trigger circuits are in their first stable state. Therefore, the regularly occurring pulses from P.R.F. oscillator 33 are passed by diode $d_2$, couple through condenser $c_2$ and appear at output terminal 30.

In the second possible circuit response, which occurs when the rate of occurrence of the input pulses is within the acceptable limits, the amplitude of the D.C. voltage from integrator 11 is sufficient to transfer trigger circuit 15 to its second stable state during which its output voltage is at a higher level substantially equal to the 23 volt biasing voltage. Trigger circuit 17, however, remains in its first stable state during which its output voltage is at its lower level. Therefore, the biasing voltages on the cathod of diode $d_1$ and on the anode of diode $d_2$ remain at the lower voltage level of trigger circuit 17, while the biasing voltages on the cathode of diode $d_2$ and on the anode of diode $d_3$ are at the higher voltage level provided by trigger circuit 15 in its second stable state. Under these conditions diode $d_2$ now is back-biased and blocks the regularly occurring pulses from the P.R.F. oscillator 33. The higher anode bias voltage of diode $d_3$ will substantially nullify the 23 volt back-biasing voltage supplied to its cathode, thereby rendering diode $d_3$ in a condition to conduct should pulses appear at its anode terminal. Because the magnitude of the input pulses coupled over lead 20 will exceed the magnitude of the lower biasing voltage on the cathode of diode $d_1$, the input pulses will couple therethrough and through coupling condenser $c_1$ to diode $d_3$ which will pass the received pulses to coupling capacitor $c_3$ and thence to the output terminal 30. Therefore, in this second operating condition the received interrogating pulses are passed directly through from input terminal 10 to output terminal 30.

In the third possible operating condition that occurs when the rate of occurrence of the input pulses exceeds the upper acceptable limit, which situation might arise due to the receipt of intentional or unintentional triggering or jamming signals, the amplitude of the D.C. voltage from integrator 11 will exceed the threshold levels of both trigger circuits 15 and 17 so that all biasing voltages for diodes $d_1$, $d_2$ and $d_3$ now are at a higher level substantially equal to the 23 volt biasing voltage. This higher biasing voltage applied to the cathode of diode $d_1$ will render this diode inoperative to pass input pulses coupled over lead 20 from input terminal 10. Diode $d_2$, however, now has substantially equal amplitude biasing voltages on its anode and cathode so that regularly occurring pulses from P.R.F. oscillator 33 now may pass diode $d_2$, capacitor $c_2$, and will appear at output terminal 30.

Therefore, it may be seen that the three circuit operations just described have the effect of substituting internally generated regularly occurring pulses at the output terminal in the event that input pulses fall below or above the predetermined limits of rate of occurrence, and permits input pulses to be directly coupled through to the output terminal when the input pulses occur at rates within the acceptable limits.

The type of operation just described is useful in a situation in which it is desired that a transponder provide a continuous output signal, for tracking purposes for example, even should the interrogating signals be temporarily interrupted, or should jamming signals mask the input interrogating signals. When the circuit of FIG. 1 is putting out the internally generated pulses from the P.R.F oscillator 33, some capabilities of the interrogating system may be lost, such as range tracking. Nevertheless, the transponder still is operative to send a reply that may be useful for other purposes such as angle tracking. Furthermore, the pulses from output terminal 30 may actuate other circuitry in a more complex transponder that will cause coded information to be radiated into space. This latter capability being useful in telemetering applications, as one example.

In other circumstances it may be desired that the circuit respond by passing therethrough the pulses that occur at a rate within acceptable limits, but produce no output at all if the pulse rate of received signals is above or below the acceptable limits. This readily may be accomplished by adjusting the switches $s_1$, $s_2$, and $s_3$ to the positions illustrated in FIG. 2. Switch $s_1$ remains unchanged, switch $s_2$ is rotated so that rotor 19 provides a connection between stator contacts 4 and 5 only, and switch $s_3$ is open. With this switching arrangement, P.R.F. oscillator 33 and diode $d_2$ effectively are out of the circuit. The circuit operates as above described to pass the input pulses when their rate of occurrence is within acceptable limits, but no output is present when the rate of occurrence is without the limits because P.R.F. oscillator 33 now is inoperative. This mode of operation is useful when it is desired that the apparatus function in its normal manner as a transponder, but the transponder remain silent in the event it is effectively jammed, or in the event the desired interrogating link is broken.

Another possible mode of operation might require that the equipment respond to pass all input signals unless their rate of occurrence exceeded some upper limit corresponding to the D.C. voltage amplitude that causes trigger circuit 17 to transfer to its second stable state. This might be desired to avoid the effects of intentional jamming, and/or to provide an overload protection for any subsequent equipment that may be coupled to output terminal 30. This mode of operation may be accomplished by positioning the switches as illustrated in FIG. 3 wherein switch $s_1$ is rotated so that rotor 18 connects only terminals 1 and 2, switch $s_2$ is rotated so that terminal 5 is connected to a 23 volt D.C. biasing source, and switch $s_3$ is open. This interconnection has the effect of removing trigger circuit 15 from the circuit of FIG. 1 and replacing it by the 23 volt biasing source, and also removing P.R.F. oscillator 33 and diode $d_2$ from the circuit. With the 23 volt bias on the anode of diode $d_3$ to overcome the like bias on the cathode, any pulses passed by diode $d_1$ also will pass diode $d_3$. Input pulses will pass diode $d_1$ so long as the output from trigger circuit 17 is low, i.e., said trigger circuit is in its first stable state. When, however, the repetition rate of input pulses is high, the amplitude of the D.C. output voltage of integrator 11 will be sufficient to permit the threshold voltage of trigger circuit 17 to be exceeded, thus raising the amplitude of its output voltage and back biasing diode $d_1$ to a blocked condition. Under this condition no output signal at all will be present at output terminal 30.

The circuit of FIG. 1 also may operate in a mode in which it will directly pass all received pulses which occur at a rate that is below the upper limit at which trigger circuit 17 transfers to its second stable state, but for rates above this upper limit the circuit functions to block the input pulses at diode $d_1$ and to couple the free running P.R.F. oscillator 33 through diode $d_2$ to the output. The switching arrangement for this mode of operation is illustrated in FIG. 4 wherein switch $s_1$ interconnects contacts 1, 2 and 3, switch $s_2$ connects contacts 5 and 6 to the 23 volt source, and switch $s_3$ is closed. The 23 volt bias coupled from contact 5 of switch $s_2$ to the anode of diode $d_3$ will enable this diode to pass any pulses that are passed by diode $d_1$, and the 23 volt bias coupled from contact 6 of switch $s_2$ to the cathode of diode $d_2$ will back bias that diode while trigger circuit 17 is in its first stable state, but when trigger circuit 17 transfers to its second stable state and raises the potential on the anode of diode $d_2$, via lead 24, diode $d_2$ will be conditioned to pass pulses from P.R.F. oscillator 33. Therefore, with this circuit interconnection and when trigger circuit 17 is in its first stable state, diodes $d_1$ and $d_3$ will pass input pulses and diode $d_2$ will be back biased to block the regularly occurring pulses from P.R.F. oscillator 33. When trigger circuit 17 transfers to its second stable state and its output voltage is at a higher amplitude, diode $d_1$ becomes back biased to block input pulses from input terminal 10, but diode $d_2$ now is enabled to pass the regularly occurring pulses from the free running pulse oscillator 33, which then couple to output terminal 30. This type of operation may be useful to provide overload protection from extremely high pulse rates, while still providing an output signal which might be useful for angle tracking purposes and/or for actuating other circuitry in the transponder.

A further mode of operation, which is permitted by the switching arrangement illustrated in FIG. 5, causes internally generated pulses from P.R.F. oscillator 33 to be coupled to the output when the input pulses occur at a rate below the acceptable limit, but input pulses are coupled directly to the output terminal for all other situations. This mode of operation would be useful when it is desired that the vehicle carrying the transponder continuously send out signals even though the interrogating signals should be interrupted. As shown in FIG. 5, switch $s_1$ connects contacts 2 and 3 to ground, switch $s_2$ connects contacts 4, 5, and 6 together, and switch $s_3$ is closed. This switching arrangement has the effect of disconnecting trigger circuit 17 from the circuit. In the operation of this arrangement when the rate of occurrence of received pulses is low and trigger circuit 15 is in its first stable state, diode $d_3$ is back biased because of the low biasing voltage from trigger circuit 15 on its anode, but diode $d_2$ is forward biased because low biasing voltages are applied to both its anode and cathode. Under these conditions the amplitudes of the pulses from P.R.F. oscillator 33 are sufficient to allow them to pass through diode $d_2$ to output terminal 30. When the rate of occurrence of input pulses exceeds the lower acceptable limit, trigger circuit 15 transfers to its second stable state that is characterized by the higher voltage output. This higher biasing voltage is coupled through contact 6 of switch $s_2$ to back bias diode $d_2$ and thus block the regularly occurring pulses from P.R.F. oscillator 33. The higher biasing voltage applied through contact 5 of switch $s_2$ to the anode of diode $d_3$ overcomes the back biasing voltage on its cathode and renders this diode capable of passing any input pulses applied thereto from diode $d_1$. The cathode of diode $d_1$ is at ground potential because of the connection of switch $s_1$ and it will pass all the received input pulses to diode $d_3$ which in turn passes them to output terminal 30.

From the above discussion it is apparent that the simple circuit of FIG. 1 is capable of providing a number of different selectable modes of operation, and when employed in a transponder that may be subject to jamming or interruption, provides a number of possibilities for responding in the presence of these conditions. Furthermore, the circuitry of this invention is particularly adaptable for use with various different types of transponder since the circuit has but a single signal input terminal and a single signal output terminal and may be incorporated into an existing transponder with a minimum of effort. It would be possible, however, that P.R.F. oscillator 33 may be replaced by means for receiving pulses from some second independent external source of signals.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Automatically responding apparatus for providing several different output responses whose respective presences are dependent upon the value of a parameter of signals from a first source, said apparatus comprising, means for receiving signals from a first source,
means for receiving signals from at least one other source,
an output terminal,
means responsive to the value of said parameter of the signals from said first source for producing controlling signals,
said controlling signals each having a plurality of distinct characteristics wherein successive ones of the plural characteristics of each of the controlling signals are produced when the value of said parameter of the signals from said first source substantially equals respective predetermined limits,
controllable switching means operable under control of said controlling signals for selectively coupling signals from said first source to the output terminal when the value of said parameter of the signals from said first source exceeds one of said predetermined limits and for coupling said signals from said other source to said output terminals when other respective predetermined limits are exceeded.

2. Apparatus for providing different output responses whose respective presences are dependent on the value of a parameter of signals from a first source, said apparatus comprising, means for receiving signals from a plurality of sources including said first source,
an output terminal,
means responsive to the value of said parameter of the signals from said first source for producing a plurality of controlling signals,
said controlling signals each having two distinct characteristics and the second characteristic of each of the controlling signals being produced when the value of said parameter of the signals from the first source substantially equals, respectively, first and second predetermined limits,
controllable switching means operable under control of said controlling signals for coupling signals from prearranged ones of said sources to the output terminal when the value of said parameter of the signals from said first source is below, between, and above said predetermined limits.

3. Apparatus for providing defferent output responses whose respective presences are dependent on the value of a parameter of signals from a first source, said apparatus comprising, means for receiving signals from said first source,
means for receiving signals from a second source,
an output terminal,
means responsive to the value of said parameter of the signals from said first source for producing first and second controlling signals,
said first and second controlling signals each having two distinct characteristics and the second characteristic of each of the controlling signals being produced when the value of the parameter of the signals from the first source substantially equals, respectively, first and second predetermined limits,
controllable switching means operable under control of said controlling signals for coupling the signals from one of said sources to the output terminal when said parameter of the signals from said first source has a first relationship relative to said first and second predetermined limits and to pass signals from the other of said sources to the output terminal when the value of said parameter of the signals from said first source has a different relationship relative to said predetermined limits.

4. Automatically responding apparatus for providing different output responses whose respective presences are dependent upon the value of a parameter of the input signals applied thereto, said apparatus comprising, an input terminal adapted to receive input signals from an external source,
an internal source of signals comprising part of said apparatus,
an output terminal,
means responsive to the value of said parameter of the input signals for producing first and second controlling signals, said first and second controlling signals each having two distinct characteristics and the second characteristic of each of the controlling signals being produced when the value of said parameter of the input signal substantially equals, respectively, first and second predetermined limits, controllable switching means for selectively coupling said input terminal and said internal source to said output terminal and operable under control of said controlling signals to pass the signals from one of said sources to the output terminal when the value of said parameter of the input signals is between said first and second predetermined limits and to pass signals from the other of said sources to the output terminal when the value of said parameter of the input signals is below the first one and above the second one of the predetermined limits.

5. An automatically responding apparatus that provides several different output responses whose respective presence are dependent upon some detectable characteristic of the input signal, the apparatus comprising, an input terminal adapted to receive said input signals, an internal source of signals comprising part of said apparatus, an output terminal, means responsive to said received signal for producing a D.C. voltage whose amplitude is a function of the detectable characteristic of the input signal, first and second biasing means each operable in response to said D.C. voltage and each adapted to provide biasing voltages of first and second amplitudes, said biasing means providing their respective biasing voltages of second amplitude when said D.C. voltage exceeds respective first and second predetermined amplitudes, controllable switching means for selectively coupling said input terminal and said internal source of signals to said output terminal and operable under control of said biasing voltages to pass the input signals to the output terminal when the amplitude of said D.C. signal has a first relationship relative to said predetermined amplitudes, and to block the input signals and couple the internal source to the output terminal when the amplitude of the D.C. signal has a second relationship relative to said predetermined amplitudes.

6. An automatically responding apparatus that provides several different output responses whose respective presence are dependent upon the rate of occurrence of received recurrent signals, the combination comprising, an input terminal adapted to received recurrent signals that may occur at an irregular repetition frequency, a second source of signals, an output terminal, signal routing means comprising first, second, and third switching means for selectively routing the received signals, the signals from the second source, or neither of said signals, to said output terminal dependent upon the rate of occurrence of said received signals, means for coupling said input terminal to a first one of said switching means and means for coupling signals from said second source to a second one of said switching means and means for coupling the third switching means to receive signals passed by the first switching means, means responsive to said received recurrent signals for producing a D.C. voltage whose amplitude is a function of the rate of occurrence of said signals, first and second biasing means each operable in response to said D.C. voltage and each adapted to provide biasing voltages of first and second amplitudes, the biasing means providing their respective biasing voltages of a second amplitude when said D.C. voltage exceeds respective first and second limits, said first switching means being coupled to said first biasing means and adapted to respond thereto to pass input signals only when the biasing signal of the first amplitude is present, said second switching means being coupled to both of said biasing means and adapted to respond thereto to block signals from the second source only when the biasing signal from the first biasing source is at a lower amplitude than that of the second biasing source, said third switching means being coupled to said second biasing means and adapted to pass signals only when the biasing voltage is at its second amplitude.

7. The combination claimed in claim 6 and further including, means for providing various different combinations of output responses as separate modes of operation of said apparatus, said means comprising, interconnecting means for effectively removing the second source from the operative circuit during a second operating mode, for additionally replacing the second biasing means by a fixed bias that enables the third switching means during a third operating mode, for altering the originally described circuit only by replacing the second biasing source by a steady biasing source substantially equal to the second magnitude biasing voltage during the fourth operating mode, and for altering the originally described circuit by replacing the first biasing means by a fixed bias that permanently enables the first switching means during a fifth operating mode.

8. Apparatus selectively responsive to the repetition frequency of pulsed signals, said apparatus comprising, an input terminal adapted to receive pulsed signals of relatively constant amplitude but whose repetition frequency may vary, means responsive to said pulsed signals for producing a D.C. voltage whose magnitude is a function of the repetition frequency of said pulsed signals, first and second biasing means each responsive to a respective threshold level of said D.C. voltage for providing biasing signals of first and second magnitudes before and after respectively, its threshold level is exceeded, a pulse generating source, an output terminal, means coupled to said input terminal and said pulse generating source and operable in response to said biasing signals for coupling said pulse generating source to said output terminal when the amplitude of the D.C. signal has a first relationship to said threshold levels, and for connecting said input terminal to said output terminal when the amplitude of said D.C. voltage has a different relationship to the two threshold levels of the biasing means.

9. Apparatus for selectively producing any one of a number of different output signals, said apparatus comprising, an input terminal adapted to receive pulsed signals whose repetition frequency may vary, integrating means coupled to said input terminal for producing a D.C. voltage whose magnitude is a function of the rate of occurrence of the pulsed signals, first and second biasing means each coupled to receive said integrated D.C. voltage and each having an input threshold level below which it produces a first biasing signal of a first magnitude and above which it produces a second biasing signal of a second magnitude, the threshold level of the first biasing means being reached at a lower value of the D.C. voltage than that of the second biasing means, a pulse source, an output terminal, signal routing means for producing a mode of operation having various responses at said output terminal as a function of the rate of occurrence of the pulsed signals received at the input terminal, said means comprising first, second and third controllable switching means, the first and second switching means being controlled by said second and first biasing means, respectively, and the third switching means being controlled jointly by said two biasing means, said input terminal being coupled to said first switching means and said pulse source being coupled to said third switching means, said first switching means operating to block signals from said input terminal when the second biasing signal from the second biasing means is coupled thereto, said second switching means operating to pass signals from the first switching means when the second biasing signal from the first biasing means is coupled thereto, and said third switching means operating to pass signals when the biasing signals applied thereto are of the same magnitude.

10. The combination claimed in claim 9 and further including mode switching means for providing a different combination of possible outputs for other modes, said means including, adjustable interconnecting means for disconnecting from the above-claimed circuit said pulse source and the third switching means during the second mode and additionally disconnecting the first biasing means and replacing it with an enabling steady biasing source during the third mode, and only replacing the first biasing source of said above-claimed circuit by an enabling steady biasing source during the fourth mode, and only disconnecting the second biasing source of said above-claimed circuit and enabling the first controllable switch during the fifth mode.

References Cited

UNITED STATES PATENTS

| | | | |
|---|---|---|---|
| 3,149,243 | 9/1964 | Garfield | 328—140 XR |
| 3,303,493 | 2/1967 | Charbonnier | 328—146 XR |
| 3,305,732 | 2/1967 | Grossman et al. | 328—140 XR |

JOHN W. CALDWELL, *Primary Examiner.*

DONALD J. YUSKO, *Examiner.*